(12) United States Patent
Chen et al.

(10) Patent No.: US 7,451,454 B2
(45) Date of Patent: Nov. 11, 2008

(54) EVENT HANDLING MECHANISM

(75) Inventors: Lechong Chen, Shanghai (CN); Feng Jin, Shanghai (CN); Jianfeng Mei, Shanghai (CN); Caidong Song, Shanghai (CN); Yaunhao Sun, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 10/562,945

(22) PCT Filed: Mar. 31, 2004

(86) PCT No.: PCT/CN2004/000289

§ 371 (c)(1),
(2), (4) Date: Dec. 28, 2005

(87) PCT Pub. No.: WO2005/099334

PCT Pub. Date: Oct. 27, 2005

(65) Prior Publication Data

US 2006/0155552 A1    Jul. 13, 2006

(51) Int. Cl.
*G06F 3/00* (2006.01)
*G06F 5/00* (2006.01)
(52) U.S. Cl. .......................................... 719/318; 710/47
(58) Field of Classification Search ................. 719/318, 719/310; 710/47
See application file for complete search history.

(56) References Cited

U.S. PATENT DOCUMENTS

| 5,319,785 | A | | 6/1994 | Thaller |
| 5,724,527 | A | * | 3/1998 | Karnik et al. ............... 710/315 |
| 5,854,905 | A | | 12/1998 | Garney |
| 6,065,073 | A | * | 5/2000 | Booth .......................... 710/46 |
| 6,108,785 | A | | 8/2000 | Poisner |
| 6,684,281 | B1 | * | 1/2004 | Sugahara et al. ............ 710/260 |
| 6,711,643 | B2 | * | 3/2004 | Park et al. ................... 710/260 |
| 6,971,103 | B2 | * | 11/2005 | Hokenek et al. ............ 718/107 |
| 6,988,140 | B2 | * | 1/2006 | Chintalapati et al. ........ 709/227 |
| 7,003,610 | B2 | * | 2/2006 | Yang et al. .................. 710/260 |
| 7,296,069 | B2 | * | 11/2007 | Nguyen ...................... 709/223 |
| 2003/0056090 | A1 | | 3/2003 | Khanna et al. |
| 2003/0120909 | A1 | | 6/2003 | Zimmer et al. |
| 2004/0268108 | A1 | | 12/2004 | Chen et al. |
| 2005/0086667 | A1 | | 4/2005 | Jin et al. |

FOREIGN PATENT DOCUMENTS

JP          04044854      *   3/1992

OTHER PUBLICATIONS

"P17237 FOA Mailed Jan. 10, 2008 for U.S. Appl. No. 10/676,481".
Intel Corporation, "Extensible Firmware Interface Specification", *Version 1.10*, (Dec. 1, 2002), whole document.

* cited by examiner

*Primary Examiner*—Meng-Ai An
*Assistant Examiner*—Lechi Truong
(74) *Attorney, Agent, or Firm*—Blakely, Sokoloff, Taylor & Zafman LLP

(57) ABSTRACT

A method and apparatus for an event handling mechanism are described. Under an embodiment of the invention, a method comprises setting a timer for a plurality of time intervals; calling a polling function at the end of each of the plurality of time intervals, the polling function being performed by a first processor; and if the polling function results in a positive result, processing the results of the polling function with a second processor.

9 Claims, 7 Drawing Sheets

EVENT HANDLING MECHANISM

The present application claims priority based on International Application No. PCT/CN2004/000289, entitled "EVENT HANDLING MECHANISM" filed Mar. 31, 2004.

FIELD

An embodiment of the invention relates to computer operations in general, and more specifically to an event handling mechanism.

BACKGROUND

In computer operations, processes generally exist to allow for special event handling. In a common example, an interrupt process may exist, in which an interrupt signal is utilized to halt normal system operations and transfer processing to the special event. However, interrupt processes by their nature utilize system require overhead and thus slow down processing.

In certain environments, special event handling may instead be handled by a timer interrupt, a system that may be referred to as "interrupt free". If certain events require monitoring, this type of event handling mechanism may be modified to include periodic polling, by which a process, a connection, or other item is checked or polled at certain intervals to determine whether action is required. Periodic polling may be implemented by using a periodic timer event and a function that is implemented each time the timer runs out.

However, periodic polling may impose certain costs on processor operations. Polling operations must be sufficiently frequent to perform as needed for the application. However, the more frequently that polling is required for an application, the greater the resulting performance penalty.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
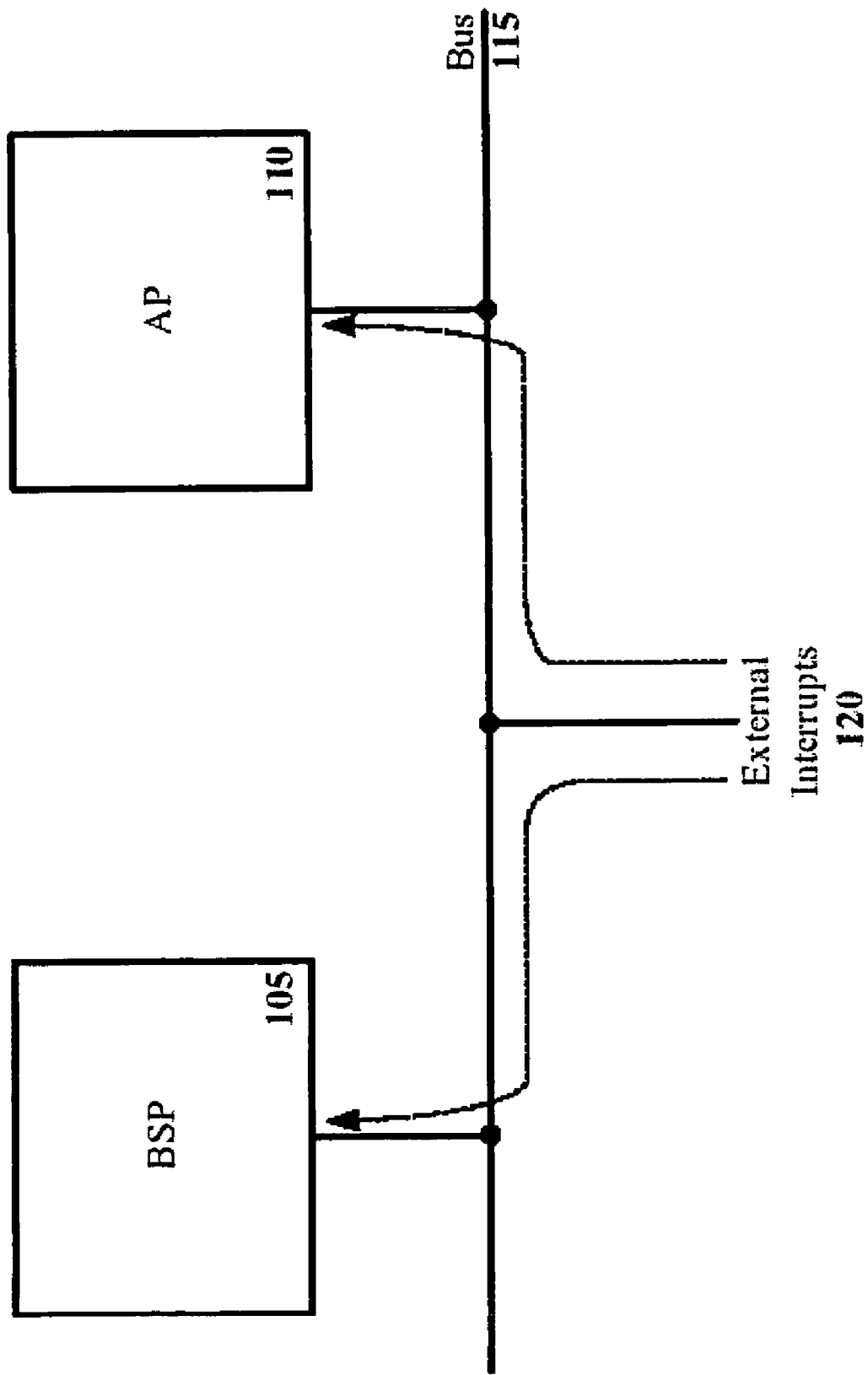
FIG. 1 illustrates a conventional interrupt process.

A method and apparatus are described for an event handling mechanism.

Before describing an exemplary environment in which various embodiments of the present invention may be implemented, certain terms that will be used in this application will be briefly defined:

As used herein, "bootstrap processor" means a processor to initialize a system. Initialization of a system may include booting an operating system.

As used herein, "application processor" means a processor other than a bootstrap processor to execute applications and processes in a system.

According to an embodiment of the invention, an event mechanism is provided in a multi-processor (MP) or hyper-threading (HT) computer architecture. According to embodiment of the invention, an event mechanism is implemented by allowing one physical or logical processor to engage in normal processing while directing special event operations to another physical or logical processor. In one example, one physical or logical processor may be a bootstrap processor and another physical or logical processor may be an application processor.

Under an embodiment of the invention, a computer architecture utilizes a timer interrupt for event notification. Under one embodiment, periodic polling is implemented using the timer interrupt. The periodic polling operation comprises the timer interrupt being set at certain time intervals, with a function or other action being called upon the timer reaching a time interval. According to one embodiment, one physical or logical processor executes normal processing in parallel at least in part with another physical or logical processor executing the periodic polling task.

Under a particular embodiment of the invention, a multi-processor (MP) or hyper-threading (HT) architecture is used to implement parallel event handling mechanism for the EFI (Extensible Firmware Interface) of Intel Corporation. (The EFI interface is described more fully in the specification, Extensible Firmware Interface Specification, version 1.10, Dec. 1, 2002, updated Nov. 26, 2003, Intel Corporation.) The event handling mechanism utilizes an asynchronous event notification in an "interrupt free" environment, which indicates that the only interrupt available is a timer interrupt. The timer interrupt is the only asynchronous event source in the EFI environment and is made available to implement asynchronous event notification.

Under an embodiment of the invention, an event handling mechanism is built upon a timer interrupt. To implement the event handling mechanism, periodic polling is implemented by utilizing a periodic timer event. By calling event and timer services, program drivers will create a periodic timer event and register a callback notification function with the event. The callback function may be executed periodically (for example, once every 1 ms) by the event handling mechanism. In one example, a USB (universal serial bus) driver may register a callback function that polls a USB port or ports periodically to determine whether any insertion or removal events of USB devices have occurred. However, an embodiment of an event handling mechanism may be implemented for any event that requires periodic polling.

While an "interrupt free" approach may simplify a computer architecture, such as the EFI architecture, and as a result enhance system stability, there are difficulties in situations such as, for example, a network stack or other network process for which real time performance is critical. In an event handling mechanism for a network stack, a polling function may be implemented to poll the network interface card (NIC) periodically to obtain incoming data in a timely manner. Because the frequency of incoming data and the length of the data that is received are generally unpredictable and because in general it is not possible to make any assumptions regarding the current condition of the network, a relative short timer period may be needed to poll with enough frequency to prevent loss of data.

However, a periodic polling mechanism that is implemented by leveraging a timer interrupt generally will interrupt the normal executing thread for a processor and thus result in a negative impact on the performance of the normal executing thread. The shorter the timer period utilized in periodic polling, the more of the CPU (central processing unit) cycle is spent on polling and the less of the CPU cycle is available for other tasks. In the handling of complex processes, such as TCP/IP (transmission control protocol over Internet protocol), the handler of a periodic timer event itself might become complex. As a result, overall system performance may be greatly slowed. At some point, the loss in speed may become intolerable in, for example, a modular computing environment where there is a large amount of data transfer between computing nodes. Therefore, as periodic polling occurs more frequently, the performance penalty to the normal executing thread may increase, but the frequency of the periodic polling needs to be high enough to achieve the real time performance required by the application.

Under an embodiment of the invention, conflict between performance of the execution thread and performance of the event mechanism is mitigated by taking advantage of additional processing power provided in MP/HT platforms. Under an embodiment of the invention, the event handling mechanism is shifted from the bootstrap processor (BSP) to an application processor (AP). In this embodiment, the burden of event handling is moved from bootstrap processor to application processor, freeing the operation of the bootstrap processor.

In general for a MP/HT system, the external interrupts can be distributed to either the bootstrap processor or an application processor, the processors being equivalent for purposes of interrupt distribution. Under an embodiment of the invention, at the beginning of the platform initialization, an application processor is dedicated to handle a timer interrupt, and the timer interrupt is specified to be distributed only to that application processor. In this embodiment, the specified application processor thus is dedicated to event handling because the event handling mechanism is built on the timer interrupt. The application processor is responsible for executing the periodic polling task implemented by exploiting a periodic timer event. The bootstrap processor then is responsible for executing the normal computing tasks. The normal computing tasks and the periodic polling tasks are executed in parallel, overlapping in time, at least in part. In this embodiment, the periodic polling task doesn't result in a significant performance penalty for the normal task and the periodic polling task may be executed as frequently as needed so as to meet the requirements of the particular application.

In a conventional BIOS (basic input-output system), a bootstrap processor may be responsible for both the execution of normal tasks and event handling. The event handling, especially the periodic polling task implemented by utilizing a periodic timer event, has a significant negative impact on the performance of the normal task. Under an embodiment of an event handling mechanism, the bootstrap processor only executes the normal task and a specified application processor provides for the event handling. With an event mechanism utilizing another processor for event handling, the performance of a normal task and the real time performance of event handling may both be improved. In an embodiment of the invention utilizing a typical BIOS PXE (pre-boot execution environment) boot, the employment of event handling with multiple processors may both reduce boot time and improve the performance for the network stack, which may in turn reduce the loss of data packets. Under such an embodiment of the invention, there is little impact to existing architecture, thus making it relatively simple to implement and deploy.

In one possible example, EFI is a single-threaded and "interrupt free" environment, with the executing thread only being interrupted by a timer interrupt. A periodic polling mechanism may be implemented in such system by leveraging the timer interrupt. A periodic polling operation would normally interrupt the normal executing thread and have a negative impact on the performance of the normal executing thread. As periodic polling occurs more frequently, the performance penalty for the normal executing thread increases. However, in practice, the frequency of the periodic polling has to be high enough in order to achieve needed real time performance. In a system having multiple processors, this dilemma may be resolved by taking advantage of computing resources other than bootstrap processor. Under an embodiment of the invention, the polling task is shifted to an application processor. At the beginning of platform initialization, an application processor is designated to handle the timer interrupt and the timer interrupt is specified to be distributed only to that application processor. The normal task and the polling task may be executed in parallel at least in part, the tasks overlapping in time.

FIG. 1 illustrates a conventional interrupt process. In FIG. 1, a conventional multi-processor system may have two or more physical processors, or may have a physical processor with hyper-threading technology providing two or more logical processors. In this illustration, a first processor serves as an application processor (AP) 110 and a second processor serves as a bootstrap processor (BSP) 105. (The processors are illustrated as separate physical processors connected to a bus 115, but a similar process may be implemented with logical processors.) External interrupts 120 can be distributed to either processor. The bootstrap processor 105 and the application processor 110 may be treated as equivalent for the purposes of interrupt distribution.

Figure 2:
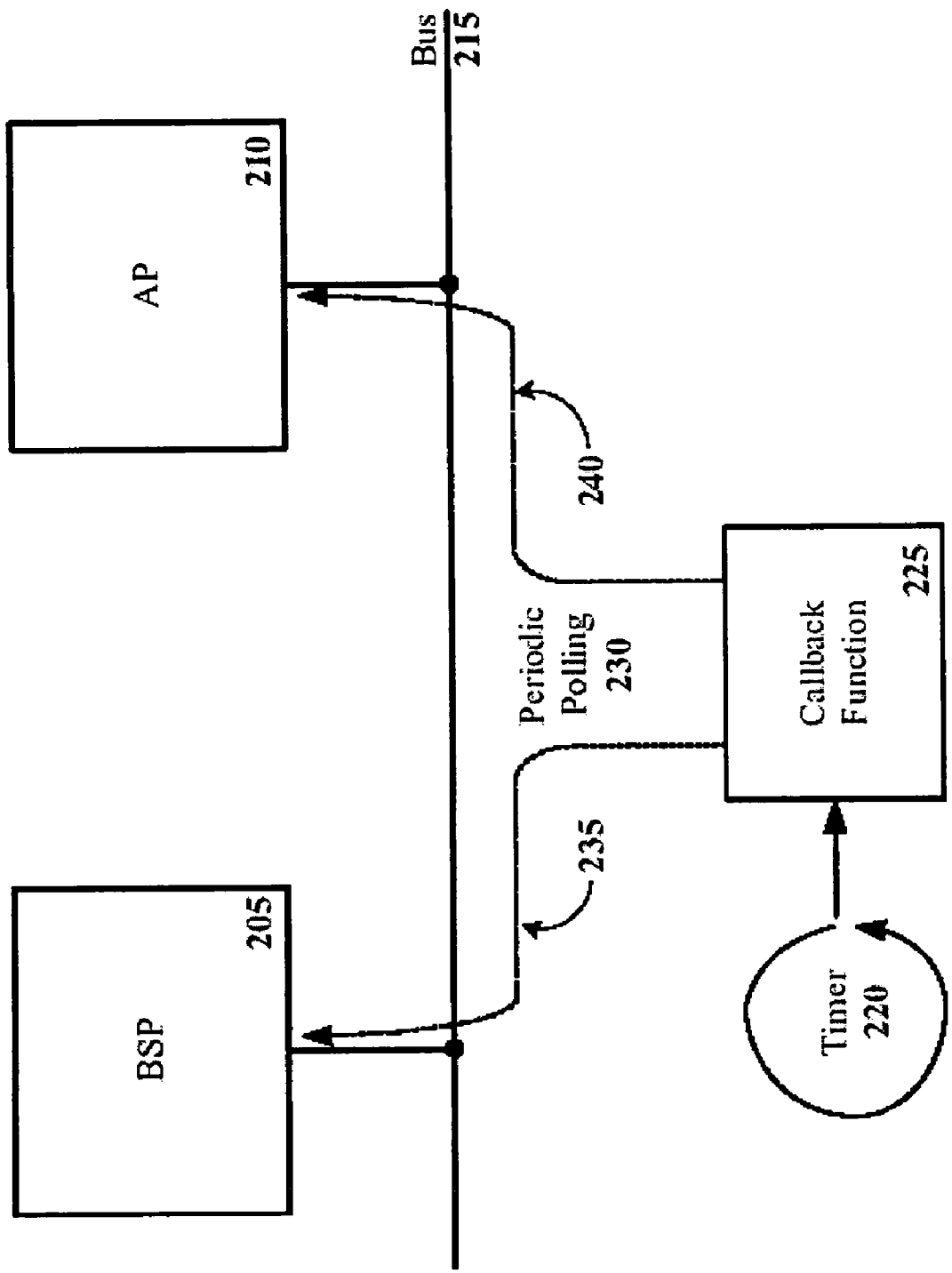
FIG. 2 illustrates an embodiment of periodic polling in a multiprocessor system.

FIG. 2 illustrates an embodiment of periodic polling in a multiprocessor system. In this illustration, a first physical or logical processor acts as an application processor 210 and a second physical or logical processor acts as a bootstrap processor 205. The processors are connected to a bus 215. In FIG. 2, the computer environment utilizes a timer interrupt, which is shown figuratively by a timer 220. Periodic polling is implemented by setting the timer 220 at periodic intervals to engage a callback function 225, thereby creating a call to a processor for periodic polling 230. In conventional systems, a function call 235 in this instance may be directed to the bootstrap processor 205. However, the periodic calls to the bootstrap processor may impose performance costs on normal processing, particularly if an application requires that the timer intervals be relatively short. Under an embodiment of the invention, the function calls 240 are instead directed to the application processor 210, which thus are handled in parallel with the normal processing operations of the bootstrap processor. The periodic polling process using parallel processing thus allows for less interruption of normal operations and greater performance.

Figure 3:
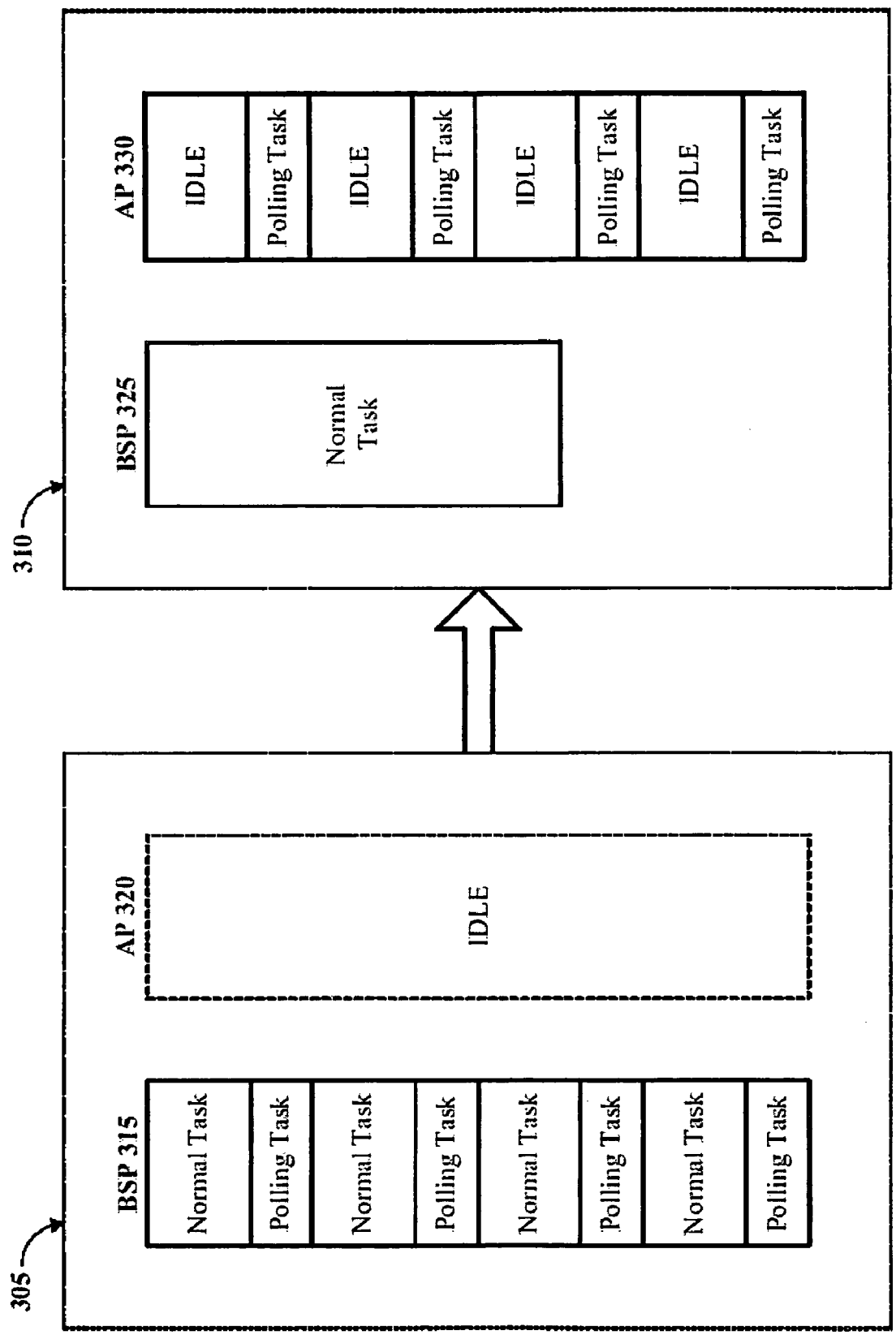
FIG. 3 illustrates an embodiment of processor tasks in an event handling mechanism.

FIG. 3 illustrates an embodiment of processor tasks in an event handling mechanism. In FIG. 3, the processing tasks are shown figuratively to illustrate the operation of an embodiment of the invention. In a non-parallel operation 305 using a timer interrupt to produce periodic polling for event management, a bootstrap processor 315 may receive periodic function calls as a timer engages a callback function at certain timer intervals. However, the periodic polling tasks impose a burden on system operation, with the polling task interrupting the normal operations of the bootstrap processor 315 at certain time intervals. In addition to the loss of processing time, the bootstrap processor 315 may become overly busy and potentially may lose certain data packets. At such time, an application processor 320 may be idle.

In a parallel operation 310, the bootstrap processor 325 may not be required to process a polling task for a periodic polling function. The bootstrap processor 325 may thus be capable of concentrating on the processing of the normal task, which, as illustrated in FIG. 3, may be completed more quickly. The application processor 330 may process the polling task, which in this illustration is shown as alternating idle periods with polling task periods.

Figure 4:
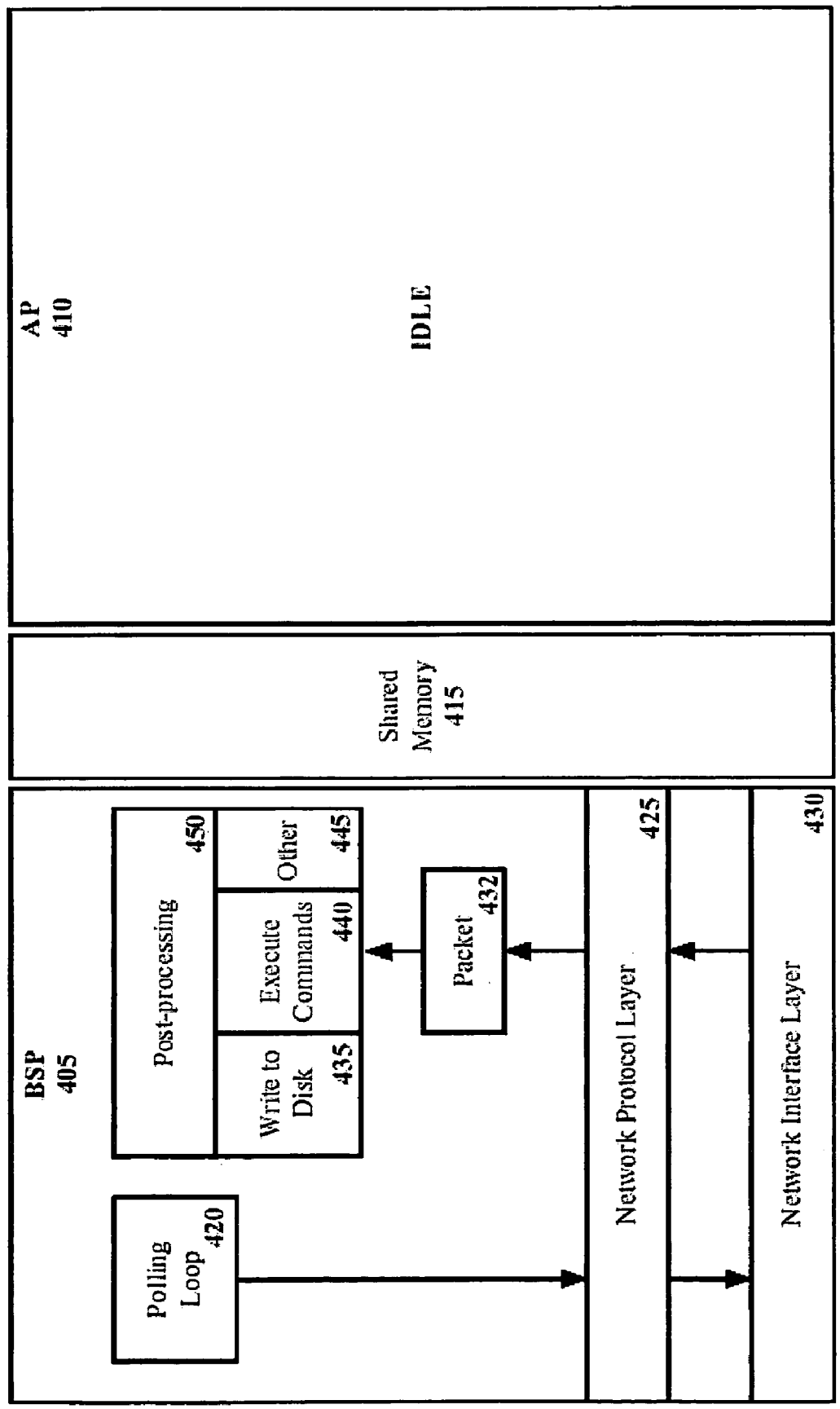
FIG. 4 illustrates an embodiment of processor operations for an event handling mechanism.

FIG. 4 illustrates an embodiment of processor operations for an event handling mechanism. FIG. 4 specifically demonstrates a TCP/IP (transmission control protocol over Internet protocol) network stack implemented using an event handling mechanism. In FIG. 4, a bootstrap processor 405 receives periodic function calls to enable a periodic polling function. An application processor 410 is present, but is idle at this time. Also illustrated is shared memory 415 that may be used to transfer data between the bootstrap processor 405 and the application processor 410, although other methods of data transfer may also be utilized. A polling loop 420 is used by an application to periodically poll the network stack. In this particular illustration, a polling loop 420 may initiate a process with a network protocol layer 425 and a network interface layer 430. Upon a determination that there is data to be transferred from the network stack, there are communications back between the network interface layer 430 and the network protocol layer 425. A data packet 432 may be transferred for processing by the bootstrap processor 405, which may require certain actions such as writing to disk 435, executing commands 440, post-processing operations 450, such as operations with regard to an FTP (file transfer protocol) server, and other functions 445. However, the workload placed on the bootstrap processor 405 may be significant, particularly if the polling loop 420 runs at a short interval. In certain cases, the periodic polling tasks may create situations in which data packets are lost or performance is otherwise unacceptable.

Figure 5:
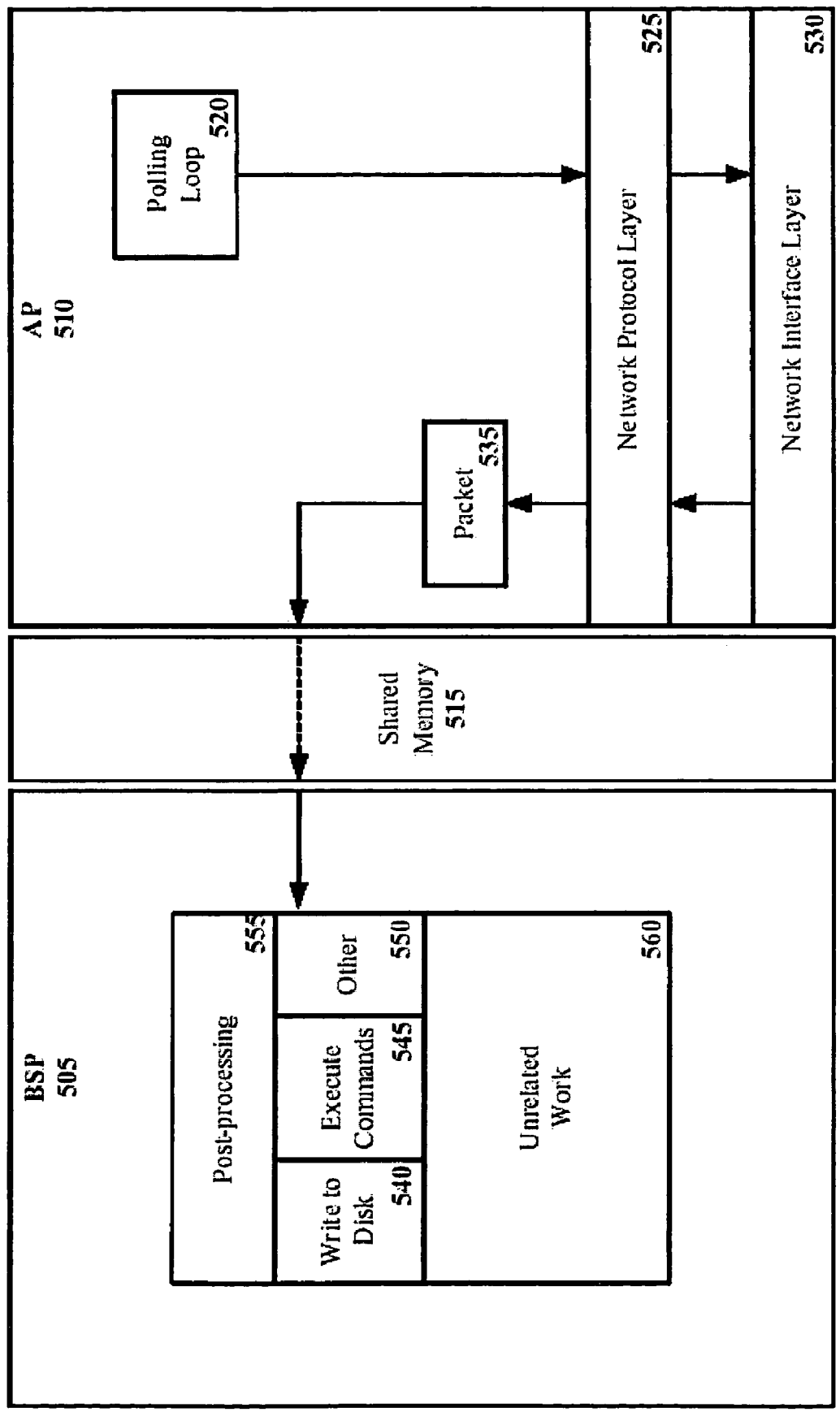
FIG. 5 illustrates an embodiment of processor operations for a handling mechanism utilizing another processor for event processing.

FIG. 5 illustrates an embodiment of processor operations for an event handling mechanism utilizing another processor for event processing. FIG. 5 demonstrates a TCP/IP network stack implemented using a parallel event handling mechanism. In this embodiment, an application processor 510 receives periodic function calls to enable a periodic polling function while a bootstrap processor 505 is engaged in normal processing. Also illustrated is shared memory 515 that may be used to transfer data between the bootstrap processor 505 and the application processor 510, although other methods of data transfer may be utilized. A polling loop 520 periodically polls the network interface. In this particular illustration, the polling loop 520 provides for communications between a network protocol layer 525 and a network interface layer 530. Upon determination that there is data to be transferred from the network stack, there are communications back between the network interface layer 530 and the network protocol layer 525. A data packet 535 may be transferred from the application processor 510 to the bootstrap processor 505 for processing, which may engage in actions such as writing to disk 540, executing commands 545, post-processing operations 555, such as operations with regard to an FTP (file transfer protocol) server, and other operations 550. Under an embodiment of the invention, the workload placed on the bootstrap processor 505 may be significantly reduced in comparison with an event handling mechanism that relies only on a bootstrap processor for the performance of a polling loop 520. With the parallel event handling mechanism, there is more opportunity for the conduct of unrelated work 560 by the bootstrap processor 505, thereby improving performance and reducing the likelihood of data loss.

Figure 6:
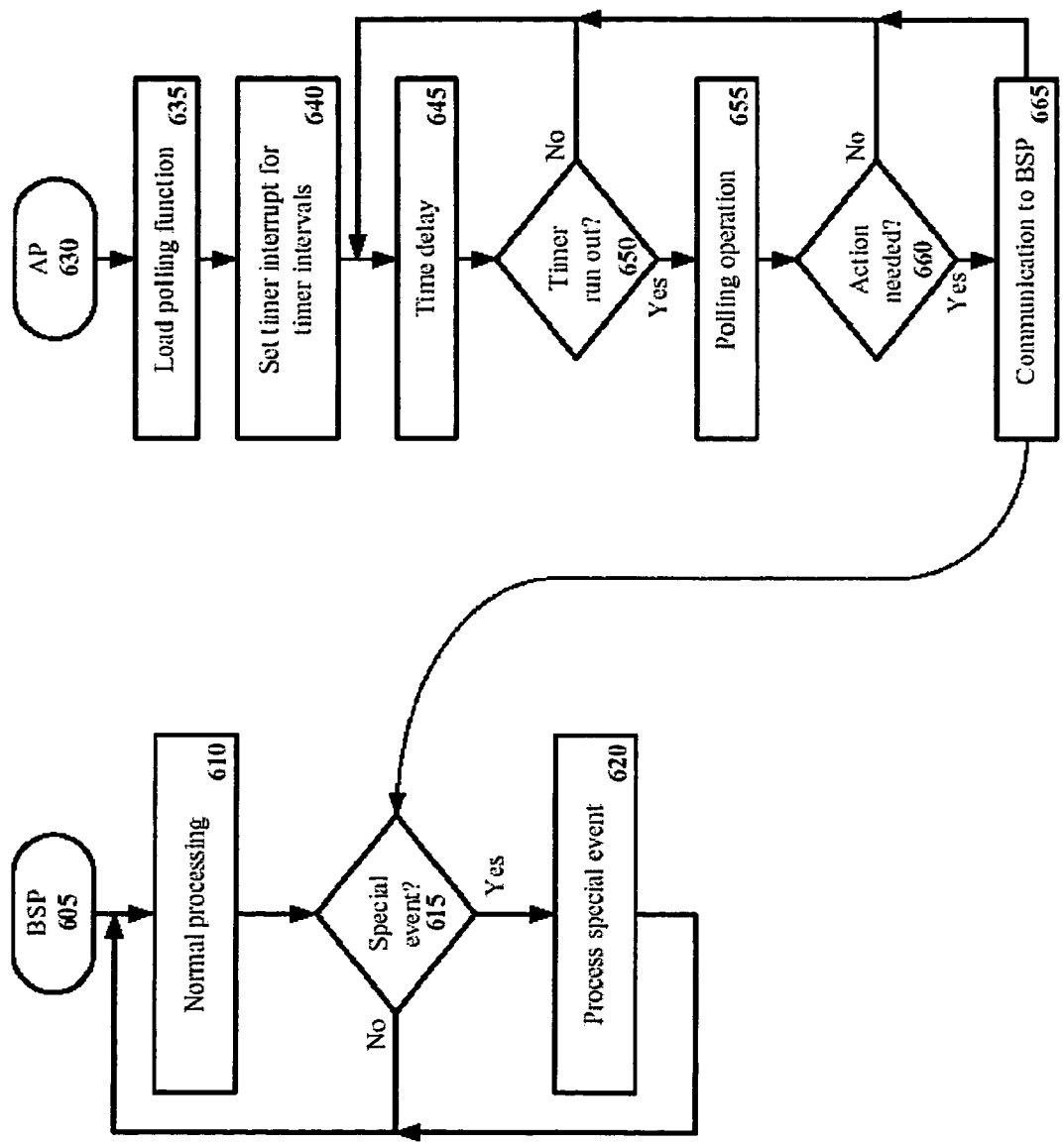
FIG. 6 is a flow chart illustrating an embodiment of event handling in a computer system.

FIG. 6 is a flow chart illustrating an embodiment of parallel event handling in a computer system. FIG. 6 illustrates certain processes for a bootstrap processor and an application processor. FIG. 6 contains a simplified process to illustrate an embodiment of parallel event handling and is not intended to illustrate all operations of the processors. In this illustration, the bootstrap processor 605 provides for normal processing 610. If a special event related to the periodic polling requires processing 615, such as a data packet from a network stack, the event data is processed 620. If there is no special event, the normal processing 610 will continue.

For an application processor 630, a polling function may be loaded 635, the polling function to provide for periodic polling. A timer interrupt is set for certain time intervals 640. The lengths of the time intervals are dependent upon the needs of the application in question. (In a particular embodiment, the timer intervals may be of equal length, such as repeating every n microseconds, but embodiments of the invention are not limited to equal time intervals.) After some time delay 645, there is a determination whether the timer has run out 650, indicating that the timer has run for a specified interval and the timer interrupt occurs. If not, the delay continues. If so, the polling function operation is performed 655. If no action is required 660, the time delay for the next time interval runs 645. If there is a positive result indicating that action is required 660, such as a data packet that requires processing, there is a communication to the bootstrap processor 665, thereby allowing the processing of the special event 620.

Figure 7:
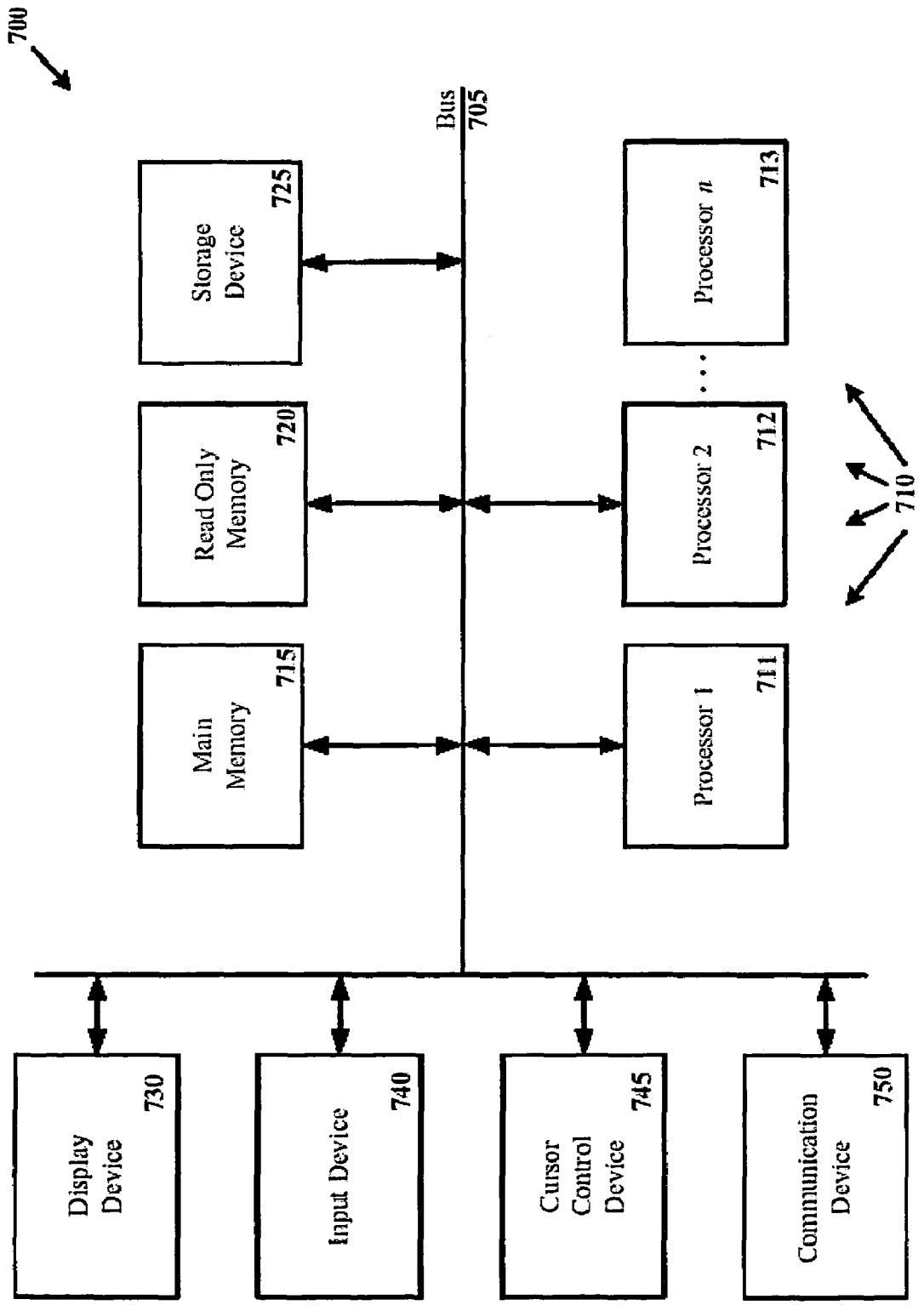
FIG. 7 is block diagram of an embodiment of an exemplary computer environment.

Embodiments of the invention may be implemented in various computer environments. FIG. 7 is block diagram of an embodiment of an exemplary computer environment. Under an embodiment of the invention, a computer 700 comprises a bus 705 or other communication means for communicating information, and a processing means such as one or more physical processors 710 (shown as 711, 712 and continuing through 713) coupled with the bus 705 for processing information. Each of the physical processors may include multiple logical processors. The physical or logical processors may operate in parallel, such as in special event handling being performed in parallel with normal thread execution. Each processor may include an execution unit and logic for the operation of certain functions.

The computer 700 further comprises a random access memory (AM) or other dynamic storage device as a main memory 715 for storing information and instructions to be executed by the processors 710. Main memory 715 also maybe used for storing temporary variables or other intermediate information during execution of instructions by the processors 710. The computer 700 also may comprise a read only memory (ROM) 720 and/or other static storage device for storing static information and instructions for the processors 710.

A data storage device 725 may also be coupled to the bus 705 of the computer 700 for storing information and instructions. The data storage device 725 may include a magnetic disk or optical disc and its corresponding drive, flash memory or other nonvolatile memory, or other memory device. Such elements may be combined together or may be separate components, and utilize parts of other elements of the computer 700.

The computer 700 may also be coupled via the bus 705 to a display device 730, such as a liquid crystal display (LCD) or other display technology, for displaying information to an end user. In some environments, the display device may be a touch-screen that is also utilized as at least a part of an input device. In some environments, display device 730 may be or may include an auditory device, such as a speaker for providing auditory information. An input device 740 may be coupled to the bus 705 for communicating information and/or command selections to the processors 710. In various implementations, input device 740 may be a keyboard, a keypad, a touch-screen and stylus, a voice-activated system, or other input device, or combinations of such devices. Another type of user input device that may be included is a cursor control device 745, such as a mouse, a trackball, or cursor direction keys for communicating direction information and command selections to processors 710 and for controlling cursor movement on display device 730.

A communication device 750 may also be coupled to the bus 705. Depending upon the particular implementation, the communication device 750 may include a transceiver, a wireless modem, a network interface card, or other interface device. The computer 700 may be linked to a network or to other devices using the communication device 750, which may include links to the Internet, a local area network, or another environment.

In the description provided above, for the purposes of explanation, numerous specific details are set forth in order to provide a thorough understanding of the present invention. However, it will be apparent to one skilled in the art that the present invention may be practiced without some of these specific details. In other instances, well-known structures and devices are shown in simplified block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product.

Many of the methods are described here in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:

initializing a computer system, the computer system including an application processor to execute applications and processes in the computer system and a bootstrap processor to initialize the computer system;

declaring the application processor to be dedicated to handling a polling function for a timer interrupt process for the computer system, wherein a normal execution thread is to be processed by the bootstrap processor, and wherein the timer interrupt process is the only method of asynchronous event handling that is available to the computer system;

setting a timer for a plurality of time intervals for the timer interrupt process;

calling a polling function at the end of each of the plurality of time intervals, the polling function being performed by the application processor, the polling function to determine if any special events have occurred; and if the polling function results in a positive result, processing the results of the polling function with the bootstrap processor;

wherein the polling function performed by the application processor comprises event handling for a network stack by polling a network interface card (NIC) of the computer system.

2. The method of claim 1, wherein the polling function provides for communications between a network protocol layer and a network interface layer for the computer system.

3. The method of claim 1, wherein a special event regards data that is available to be transferred from the network stack.

4. The method of claim 1, wherein the normal execution thread is processed by the bootstrap processor in parallel at least in part with performance of the polling function by the application processor.

5. A computer-readable medium having stored thereon data representing sequences of instructions that, when executed by a processor, cause the processor to perform operations comprising:

initializing a computer system, the computer system including an application processor to execute applications and processes in the computer system and a bootstrap processor to initialize the computer system;

designating the application processor as being dedicated to handle a polling function for a timer interrupt process for the computer system, wherein a normal execution thread is to be processed by the second processor wherein the timer interrupt process is the only method of asynchronous event handling that is available to the computer system, wherein the polling function provides for polling of a network interface for data packets that are ready for transfer;

setting a timer for a plurality of time intervals for the timer interrupt process;

calling a polling function at the end of each of the plurality of time intervals, the polling function being directed to the application processor, the polling function to determine if data packets are ready for transfer; and if the polling function results in a positive result, transferring the data packets to the bootstrap processor;

wherein processing of the normal execution thread by the bootstrap processor overlaps in time at least in part with performance of the polling function by the application processor.

6. A computer system comprising:

an application processor to execute applications and processes in the computer system, wherein the application processor is to be declared as dedicated to handling a polling function for a timer interrupt process for the computer system, and wherein the timer interrupt process is the only method of asynchronous event handling that is available to the computer system;

a bootstrap processor to initialize the computer system, wherein a normal execution thread is to be processed by the bootstrap processor;

a timer, the timer to be set for a plurality of time intervals for the timer interrupt process;

wherein a polling function is to be called at the end of each of the plurality of time intervals, the polling function to be performed by the application processor, the polling function to determine if any special events have occurred;

wherein, if the polling function results in a positive result, the results of the polling function are to be processed with the bootstrap processor; and wherein the polling function performed by the application processor comprises event handling for a network stack by polling a network interface card (NIC) of the computer system.

7. The computer system of claim 6, wherein the polling function provides for communications between a network protocol layer and a network interface layer for the computer system.

8. The computer system of claim 6, wherein a special event regards data that is available to be transferred from the network stack.

9. The computer system of claim 6, wherein the normal execution thread is processed by the bootstrap processor in parallel at least in part with performance of the polling function by the application processor.

\* \* \* \* \*